E. A. BACKUS.
LUBRICATOR.
APPLICATION FILED JAN. 11, 1913.

1,106,273.

Patented Aug. 4, 1914.

Witnesses;
Christ Feinle, Jr.,
V. B. Hillyard.

Inventor,
E. A. Backus.
By Victor J. Evans,
Attorney.

UNITED STATES PATENT OFFICE.

EDWARD A. BACKUS, OF LITTLE ROCK, ARKANSAS.

LUBRICATOR.

1,106,273.    Specification of Letters Patent.    Patented Aug. 4, 1914.

Application filed January 11, 1913. Serial No. 741,503.

*To all whom it may concern:*

Be it known that I, EDWARD A. BACKUS, a citizen of the United States, residing at Little Rock, in the county of Pulaski, and State of Arkansas, have invented new and useful Improvements in Lubricators, of which the following is a specification.

The present invention has relation to lubricators and more particularly to the variety in which the lubricant is expelled from the cup or receptacle by means of a forced feed which is effected by means of a plug, cap or like part having screwthread connection with the body of the cup or receptacle, said forced feeder being provided with means for securing it in the adjusted position.

The invention provides novel means for securing the lubricator to the part to be oiled, thereby preventing loss or displacement of such lubricator.

The invention further relates to the novel means whereby the force feeder is secured in position when advanced, said means being automatic in operation and enabling the feeder to be advanced when it is required to supply more lubricant to the bearing part.

The invention consists of the novel features, details of construction and combination of parts, which hereinafter will be more particularly set forth, illustrated in the accompanying drawing, and pointed out in the appended claims.

Figure 1:
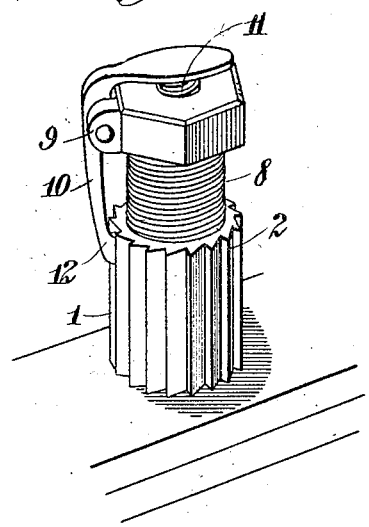
Figure 2:
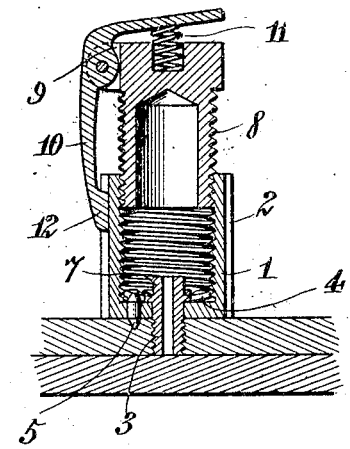
Figure 3:
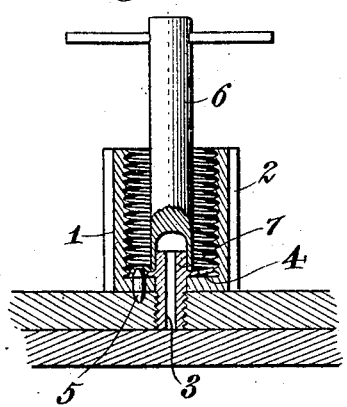
Figure 4:
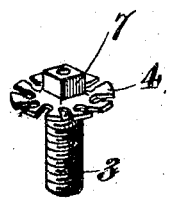

Referring to the drawing, forming a part of the specification, Figure 1 is a perspective view of a lubricator embodying the invention. Fig. 2 is a vertical central section thereof. Fig. 3 is a sectional view of the cup or receptacle with the force feeder removed and showing the key in position for tightening or loosening the cup. Fig. 4 is a detail perspective view of the means for securing the lubricator and the working part.

Corresponding and like parts are referred to in the following description, and indicated in all the views of the drawing, by the same reference characters.

The numeral 1 designates the cup or receptacle for receiving the lubricant which may consist of hard oil, grease or other material for oiling bearing parts. This cup may be of any capacity or construction and is preferably of cylindrical form and is internally threaded and formed upon its exterior with longitudinal teeth 2 which have one face straight and the other inclined to admit of ratchet effect when advancing the force feeder. An opening is formed in the center of the bottom of the cup and receives a threaded stem 3 by means of which the lubricator is attached to the working part. The threaded stem 3 is formed intermediate of its ends with a flexible flange which is notched in its outer edge to form teeth 4, which are adapted to engage a projection 5 extending upwardly from the bottom of the cup, thereby holding the threaded stem from casual movement when screwed home. The projection 5 is rounded at its upper end, thereby enabling the teeth 4 to ride thereover upon the application of sufficient force to the threaded stem to turn the same either to tighten or loosen the cup. The threaded stem 3 is adapted to be turned by means of a key 6 or other tool and for this purpose the threaded stem 3 has an angular extension 7, which projects above the toothed flange. An opening is formed through the angular extension 7 and threaded stem to provide a passage for the discharge of the lubricant from the cup. The projection 5 consists of a pin which is set into an opening formed in the bottom portion of the cup and extends above and below such bottom, the outer extension being adapted to enter an opening formed in the part to which the lubricator is secured to prevent accidental turning thereof.

The force feeder consists of a plug or cap 8, which is externally threaded to match the internal screw-threads of the cup or receptacle 1. The upper end of the plug or cap 8 is of angular formation to admit of the application of a wrench or other tool thereto when it is required to turn such plug to forcibly expel the lubricant from the cup. A pair of ears 9 are formed at one side of the plug 8 and receive between them a pawl 10 which is pivotally mounted upon a pin supported at its ends in the ears. The pawl 10 is of L form, one member extending along the side of the plug to engage over the cup or receptacle 1 and the other member extending across the end of the plug to form a finger piece and to receive the end thrust of a spring 11 which is let into a recess formed in the outer end of the plug. The longitudinal member of the pawl is provided at its extremity with a stop 12, which is adapted to engage the teeth 2 extending longitudinally upon the exterior of the cup 1.

The lubricant is placed in the cup or receptacle 1 after the plug 8 has been detached therefrom and after said cup has thus been supplied the plug is screwed therein a short distance so as to expel a small quantity of the lubricant through the threaded stem 3. The turning of the plug advances the same within the cup and serves as means to forcibly expel grease or hard oil. As it becomes necessary from time to time to lubricate the part the plug 8 is given a partial turn through the instrumentality of a wrench or other tool, the stop 12 of the pawl 10 riding upon the teeth 2 and engaging one of the latter to prevent backward rotation of the plug. After the plug has been advanced to the limit of its movement and it becomes necessary to replenish the cup the end of the pawl extending over the plug is pressed upon to disengage the stop 12 from the teeth 2 and at the same time the plug is backed to remove it from the cup, which latter is supplied with lubricant after the plug has been wholly removed therefrom. After the cup has been filled the plug is replaced and the operation previously described repeated.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a lubricator of the character described, the combination of a cup having an opening in its bottom and provided with a projection rising from the bottom at one side of the opening, a threaded stem adapted to pass through the opening in the bottom of the cup for securing the latter to the part to be lubricated, said threaded stem having a discharge opening and provided with an elastic flange toothed at its outer edge to engage the projection of the cup to prevent movement of the threaded stem after the parts have been positioned.

2. In a lubricator of the character described, the combination of a cup provided in its bottom with a central and a side opening, a pin set in the said side opening and projecting above and below the bottom of the cup, the lower end of the pin serving to secure the cup against rotation when in position, and a threaded stem passing through the said central opening in the bottom of the cup for securing the latter to the part to be lubricated, said threaded stem having an opening and provided with an elastic flange which is toothed at its outer edge to engage the upper end of the aforesaid pin.

In testimony whereof I affix my signature in presence of two witnesses.

EDWARD A. BACKUS

Witnesses:
W. S. MARTIN,
J. F. HERD.